Patented Nov. 7, 1950

2,529,387

UNITED STATES PATENT OFFICE 2,529,387

METHOD OF PRODUCING BESSEMER STEEL

Ture Robert Haglund, Stockholm, Sweden, assignor to Stora Kopparbergs Bergslags Aktiebolag, Falun, Sweden No Drawing. Application August 8, 1947, Serial No. 767,657. In Sweden July 12, 1943

Section 1, Public Law 690, August 8, 1946
Patent expires July 12, 1963

5 Claims. (Cl. 75—60)

The present invention refers to the production of steel or iron according to the Bessemer-process both according to the acid and according to the basic method, and the invention has for its object to provide for better facilities for the control of the furnace process and for obtaining a higher quality product.

The invention is substantially distinguished by the feature that a mixture of oxygen gas or air enriched in oxygen and carbon dioxide is used as an oxidation gas during the later part of the blowing operation. The carbon dioxide participates itself in the oxidation process with the formation of CO, heat being then also absorbed. Bessemer-blowing with the use of pure oxygen gas as the oxidation gas produces a reaction so intensive and so great a rise of the temperature in the bath that the process becomes difficult to manage. By the supply of $CO_2$ to the oxygen gas, heat is absorbed partly through decomposition of $CO_2$ and partly by heating of the quantity of gas, which is increased as compared with the conditions prevailing when oxygen gas alone is employed. By controlling the quantity of $CO_2$ supplied it will therefore be possible to regulate the temperature conditions during the blowing operation as desired. By the supply of $CO_2$ to the oxygen gas used as an oxidation gas it will thus be possible to conduct the process in such manner that a lesser, a greater or the same heat absorption is obtained, as desired, than with the use of ordinary air, in spite of the fact that the total escaping quantity of gas will be considerably smaller.

By Bessemer-blowing by means of a mixture of $O_2$ and $CO_2$ poor in nitrogen a steel or iron will be obtained which is considerably poorer in nitrogen than the product obtained with the use of air. It is not necessary, however, for this purpose to use said gas mixture during the whole of the blowing period. It is suitable to carry out the first and even the substantial portion of the blowing operation with the use of air, the final blowing being then carried out with a mixture of $O_2$ and $CO_2$ which is poor in nitrogen. A portion of the initially absorbed nitrogen will then escape from the steel or iron during this final blowing period. In the manufacture of iron which is poor in carbon, it is possible, for instance, to blow with air, until the percentage of carbon has been lowered to about 0.5–0.4%, after which one may pass over to the use of a mixture of oxygen gas and carbon dioxide. If great importance is attached to a low percentage of nitrogen, the change should take place earlier.

If, when using a mixture of air enriched in oxygen together with $CO_2$ as an oxidation gas the percentage of nitrogen of said gas mixture is comparatively high, then the percentage of nitrogen in the iron bath will not be lowered to the same extent as with the use of a mixture of oxygen gas poor in nitrogen and of $CO_2$. If a low percentage of nitrogen is desired in the steel or iron one should therefore, in carrying out Bessemer-blowing with the use of air enriched in oxygen or of a mixture of such air and $CO_2$, effect the final blowing with a mixture of $O_2$ and $CO_2$ which is poor in nitrogen.

With the use of a mixture of oxygen gas and carbon dioxide the escaping quantity of gas will be considerably less than when blowing with ordinary air. With the use of an unaltered blowing time the losses by boiling out will therefore be considerably less. It is also possible to carry out the process in such manner that more oxidation agents are supplied per unit of time, whereby the blowing time is cut down.

In such cases where a low percentage of nitrogen is desired in the product, it is important to blow with a gas mixture having a low percentage of nitrogen, preferably below 4 per cent by volume. For practical reasons the use of pure oxygen gas is not considered economical. On the other hand, it is advantageous to use oxygen gas containing about 96 to 98% $O_2$. The carbon dioxide may be advantageously obtained from blast furnace gas or from waste gases. The waste gases from the Bessemer converter may also be used for this purpose.

The percentage of $CO_2$ in the oxidation gas may be varied within very wide limits. With the use of oxygen gas or of air highly enriched in oxygen it may thus be found suitable to supply so much $CO_2$ that the percentage by volume of $CO_2$ amounts to between 40 and 70%. In other cases one may use considerably more, for instance up to about 80%, in others considerably less, for instance down to 20–30%. In the supply of $CO_2$ to air enriched in oxygen and having a high percentage of nitrogen, smaller quantities counted in percentage by volume are generally used than is the case in the use of oxygen gas.

When blowing a pig iron rich in phosphorus, for instance containing 1 to 2.5% phosphorus, the part of the phosphorus above 1.4% P as a rule oxidizes during the first period of the blowing operation before or at the same time as the carbon content of the pig iron oxidizes. An essential part of the phosphorus content however oxidizes when the oxidation of the carbon is principally finished.

When the carbon content is reduced to about 0.1%, there is as a rule still a phosphorus content of about 1.4% left in the iron, or, if the original content of the phosphorus was lower than 1.4%, almost the whole original phosphorus content of the pig iron is still left in the metal bath. The percentage of phosphorus left in the iron, when the carbon content is mainly oxidized, varies to a certain extent depending on the temperature of the metal during the blowing operation. At the continuation of the blowing operation, when the final oxidation of the phosphorus takes place, the oxygen content of the blast will be nearly substantially consumed for the formation of oxides of phosphorus and iron, whereby no essential formation of carbon monoxide takes place. When utilizing a blast solely consisting of air the oxygen will be almost fully absorbed without formation thereby of other gases. The remaining part of the blast flowing through the metal bath will in such case consist almost entirely of nitrogen. Such will also be the case when using a blast consisting solely of air enriched in oxygen. The partial pressure of the nitrogen, when using a blast consisting solely of air or air enriched in oxygen, will accordingly be considerably increased during the operation for the final oxidation of the phosphorus content, and accordingly the conditions favoring absorption of nitrogen in the iron bath considerably increases.

By utilizing, according to the present invention, a blast containing air enriched in oxygen and carbon dioxide during the final oxidation of the phosphorus, the partial pressure of the nitrogen will be considerably reduced and thus the possibilities for the iron bath to absorb nitrogen will be considerably reduced. During the final oxidation of the phosphorus content it is suitable to adjust the mutual relation between the said oxidizing gases so, that the reaction gaseous products deriving from the $CO_2$ content of the blast are the main part of the total amount of gases leaving the metal bath during the said final oxidation. During the oxidation of phosphorus and iron by means of the $CO_2$ the same volume of CO is formed as the volume of $CO_2$ consumed for the formation of oxides of phosphorus and iron. The nitrogen derived from the air enriched in oxygen will thus be diluted by the aforesaid amount of carbon monoxide and also by the part of the $CO_2$, which occasionaly does not take part in the reaction. The utilization of a blast consisting only of $CO_2$ for the final oxidation of the phosphorus would of course further reduce the partial pressure of the nitrogen. This way is, however, not practical as the temperature of the iron bath in such case would be decreased more than is desirable.

During the first blowing period, at which the carbon as well as the part of the phosphorus above about 1.4% P is oxidized the use of a blast of ordinary air is preferable. A blast of air enriched in oxygen together with $CO_2$ is, however, according to the invention, used for the final oxidation of the phosphorus content. The use of the latter blast can be started immediately after the carbon content is mainly oxidized, but alternatively the change can be started somewhat earlier, when a part of the carbon, for instance about 0.5% $C_f$ is left in the bath or somewhat later i. e. after a part of the final oxidation of the phosphorus. For instance when the P-content of the bath has gone down to about 1%. During the first part of the final oxidation of the phosphorus it is sometimes suitable to start with a blast containing air enriched in oxygen to a lower degree and also containing a lower percentage of $CO_2$, and then successively or periodically to lower the content of nitrogen and to increase the percentage of $CO_2$ in the blast. When utilizing air highly enriched in oxygen, for instance containing 90-98% $O_2$, for composing the $CO_2$ containing blast, this can for instance be done in such a way, that, when changing, the $CO_2$ containing blast at first is blown in together with air, whereafter the amount of air is successively or gradually reduced. The proportion $CO_2:N_2$ will thus increase, as the content of phosphorus in the iron bath decreases. It is suitable to adjust the proportion $CO_2:N_2$ in such a way, that the content of $CO_2$ counted in volume, at least during the later period of the final oxidation of phosphorus, amounts to 5 to 10 times the content of nitrogen. When utilizing an air enriched with oxygen up to about 90-98% $O_2$ for the final oxidation of the phosphorus, it is suitable to add such a quantity of $CO_2$, that the percentage of $CO_2$, counted in volume, amounts to between 20-40%.

What I claim is:

1. In the process for the manufacture of iron or steel from pig iron by Bessemer blowing consisting in blowing after the carbon content of the pig iron is reduced to about 0.5% with a blast essentially consisting by volume of at least 20% carbon dioxide, at least 20% oxygen and less than 10% nitrogen with the carbon dioxide and oxygen forming at least 90% of said blast.

2. In the process for the manufacture of iron or steel from pig iron by Bessemer blowing consisting in blowing after the carbon content of the pig iron is reduced to about 0.5% with a blast essentially consisting by volume of at least 20% oxygen, 20% to 80% carbon dioxide and less that 4% nitrogen with the carbon dioxide and oxygen forming at least 90% of said blast.

3. In the process for the manufacture of iron or steel from pig iron by Bessemer blowing consisting in blowing with a blast essentially consisting of air until the carbon content of the bath is lower than 0.5% and the blowing with a blast essentially consisting by volume of at least 20% carbon dioxide, at least 20% oxygen and less than 4% nitrogen with the carbon dioxide and oxygen forming at least 90% of said blast.

4. In the process for the manufacture of iron or steel from pig iron by Bessemer blowing consisting in blowing with a blast essentially consisting of air during the oxidizing of a substantial portion of the carbon content of the pig iron, and thereafter blowing with a blast essentially consisting by volume of at least 20% carbon dioxide, at least 20% oxygen and less than 10% nitrogen with the carbon dioxide and oxygen forming at least 90% of said blast.

5. In the process for the manufacture of iron or steel from pig iron rich in phosphorus by basic Bessemer blowing consisting in blowing with a blast essentially consisting of air until the carbon content of the bath is lower than 0.1% and the blowing with a blast essentially consisting by volume of at least 20% carbon dioxide, at least 20% oxygen and less than 4% nitrogen with the carbon dioxide and oxygen forming at least 90% of said blast.

TURE ROBERT HAGLUND.

(References on following page)

REFERENCES CITED

The following references are of record in the file of this patent:

UNITED STATES PATENTS

| Number | Name | Date |
|---|---|---|
| 75,240 | Bennett | Mar. 10, 1868 |
| 86,859 | Phillips | Feb. 9, 1869 |
| 843,592 | Eldred | Feb. 12, 1907 |
| 1,034,785 | Greene | Aug. 6, 1912 |
| 1,608,270 | Friderich | Nov. 23, 1926 |
| 1,709,389 | Davis | Apr. 16, 1929 |
| 2,077,568 | Kinzel | Apr. 20, 1937 |
| 2,333,654 | Lellep | Nov. 9, 1943 |

FOREIGN PATENTS

| Number | Country | Date |
|---|---|---|
| 850,271 | France | Sept. 4, 1939 |
| 873,948 | France | Apr. 13, 1942 |
| 204,407 | Germany | July 17, 1907 |
| 286,745 | Great Britain | Feb. 29, 1928 |
| 518,212 | Great Britain | Feb. 21, 1940 |

OTHER REFERENCES

Fourth Report on the Heterogeneity of Steel Ingots, published by the British Iron and Steel Institute, London (1932), page 89.